Feb. 11, 1930.   R. L. MORGAN   1,746,491
CONNECTING ROD
Filed Dec. 7, 1927   2 Sheets-Sheet 2

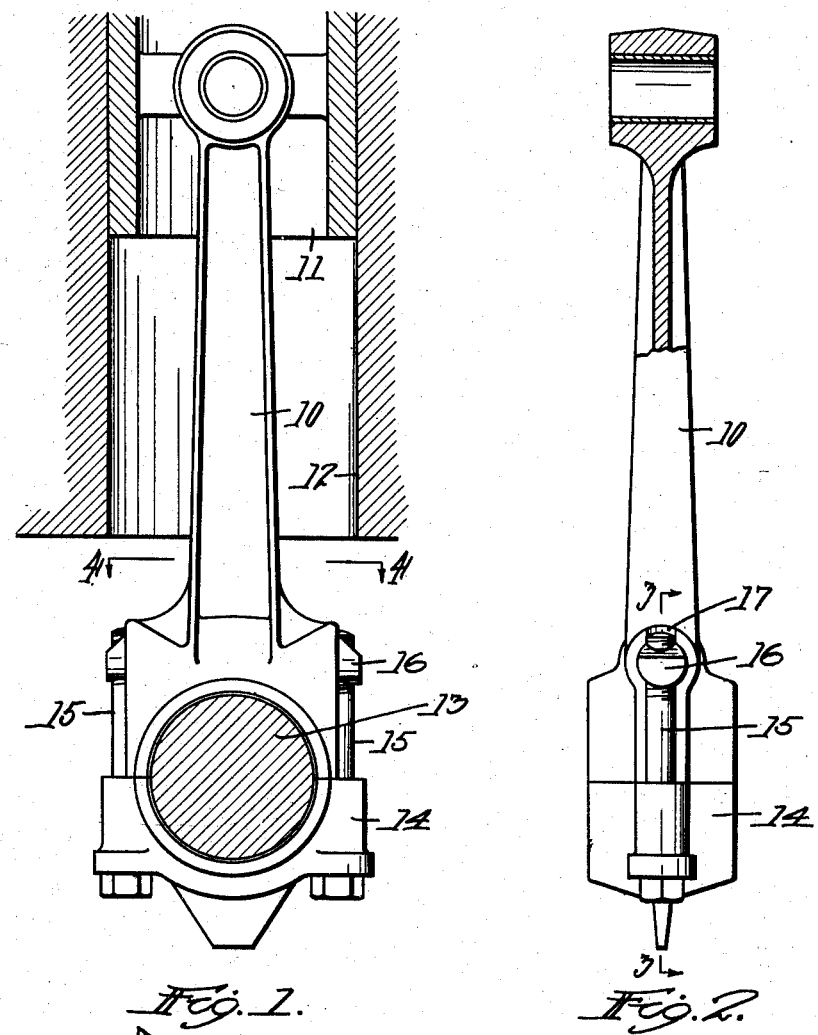
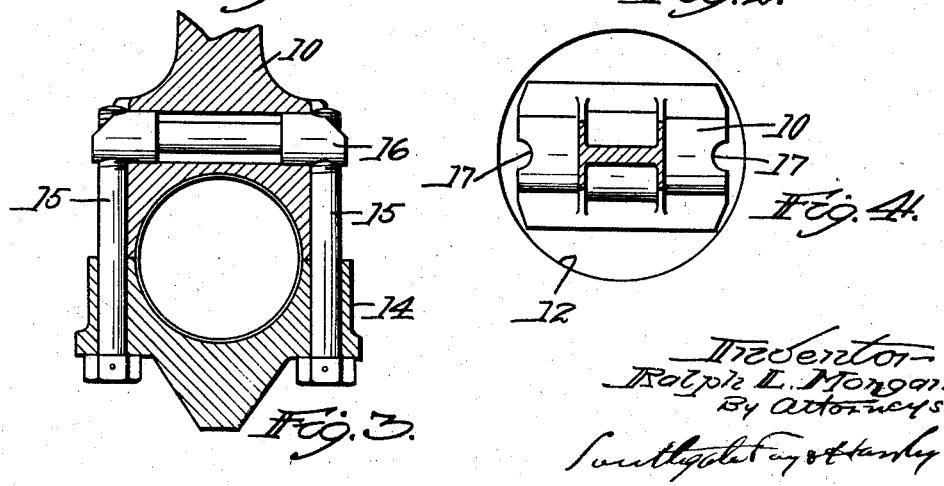

Inventor
Ralph L. Morgan
By Attorneys

Patented Feb. 11, 1930

1,746,491

UNITED STATES PATENT OFFICE

RALPH L. MORGAN, OF WORCESTER, MASSACHUSETTS

CONNECTING ROD

Application filed December 7, 1927. Serial No. 238,425.

This invention relates to a connecting rod for an internal combustion engine.

The principal object of the invention is to provide a rod with means for securing the cap thereon of such a nature that the rod is adapted to receive a crank of a very large diameter compared with the diameter of the cylinder of the engine and to provide it with means for fastening the cap thereon which, when removed, will allow the rod to be drawn through the cylinder. The invention also involves means constituting part of the cap attaching means which will strengthen the rod at that point and will occupy a minimum space entirely outside the rod itself.

Other objects and advantages of the invention will appear hereinafter.

Reference is to be had to the accompanying drawings in which

Fig. 1 is a side view of a connecting rod and its cap constructed in accordance with this invention and showing the crank and cylinder in section;

Fig. 2 is an edge view of the same;

Fig. 3 is a sectional view on the line 3—3 of Fig. 2;

Fig. 4 is a sectional view on the line 4—4 of Fig. 1 showing the head of the rod in elevation;

Figure 5:
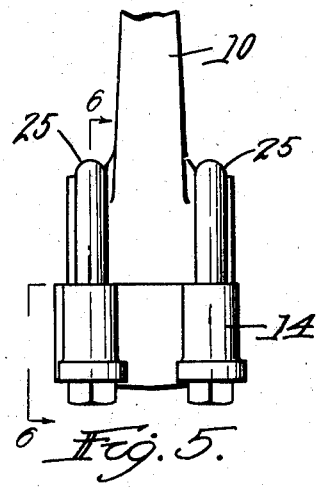
Fig. 5 is a side view of a modification.

In high compression engines it is necessary to have the crank shaft and the cranks thereon of comparatively large diameter. If designed in accordance with the usual practice this diameter is limited to a comparatively small fraction of the diameter of the cylinder because it is necessary to provide for drawing the entire connecting rod through the cylinder in assembling and for repairs.

I have shown the connecting rod 10 with its usual construction at the upper end and adapted to be made of duraluminum or other suitable material. It is of course connected to the piston 11 in the usual manner in the cylinder 12. It is adapted to receive a crank 13 which, in the present case, is about 80 percent of the diameter of the cylinder. The connecting rod and its cap 14 are of course provided with half bearings for the crank in the usual way.

On account of the extra large size of this bearing as compared with the size of the cylinder, through which it is desired to move the connecting rod, I connect the cap with the butt end of the connecting rod by means of a pair of bolts 15 extending longitudinally through the cap and along semi-circular recesses 17 in the sides of the connecting rod at this point. These screw into a steel bar 16 which, on account of the recesses 17, will project beyond the sides of this end of the connecting rod only a short distance and yet be adapted to be perforated and screw threaded to receive the bolts. These bolts, extending as they do half way into the recesses 17 in the rod, take up only a little room. They screw into the ends of the cross bar 16 and a part of them is located within the periphery of this end of the connecting rod.

When it is desired to disconnect the connecting rod from the crank, the two bolts are withdrawn and the cross bar 16 is pulled out sideways from a passage in the connecting rod in which it is normally located. This removes the projecting parts and the connecting rod can be lifted off the crank and drawn through the cylinder in the usual way.

This provides a strong and rigid construction for connecting the cap with the connecting rod and affords a securing means therefor which can be dismounted readily and assembled without much trouble and which leaves the connecting rod in such form that it will provide a bearing for a large crank and yet will be capable of being moved up into the cylinder with sufficient clearance for the purpose described.

Figure 6:
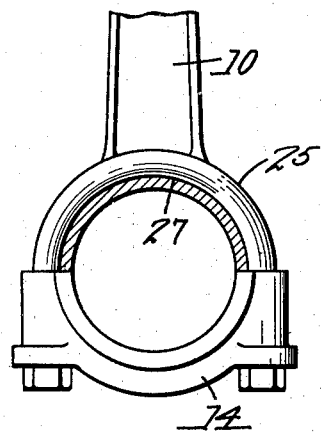
Fig. 6 is a sectional view on the line 6—6 of Fig. 5.
Figure 7:
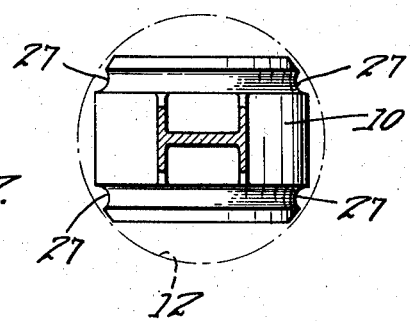
Fig. 7 is a plan of the same.

In Figs. 5, 6 and 7 I have shown another form in which the invention can be embodied. In this case U-bolts 25 take the place of the bolts 15. They are located partly in grooves or recesses 27 taking the place of the recesses 17 and performing the same function.

Although I have illustrated and described only two forms of the invention I am aware of the fact that other modifications can be made therein by any person skilled in the art without departing from the scope of the invention as expressed in the claims.

Therefore, I do not wish to be limited in these respects, but what I do claim is:—

1. In a connecting rod and its cap, the combination of a steel bar extending through the connecting rod at a point near its butt end and detachable therefrom and having a pair of passages therethrough, a pair of fastening devices adapted to be secured within said passages and passing through the cap for securing the parts together.

2. The combination with a connecting rod for an engine and its cap, of a pair of bolts for connecting the cap with the connecting rod extending along the outer surface of the adjacent end of the connecting rod and a cross bar having tapped holes for receiving the bolts, said cross bar being located in a passage through the connecting rod and being detachable for the purpose described.

3. In a connecting rod and its cap, the combination of a steel bar extending through the connecting rod at a point near its butt end and detachable therefrom and having a pair of tapped passages therethrough, a pair of bolts adapted to be screwed into said passage and passing through the cap for securing the parts together.

4. In a connecting rod and its cap, the combination of a steel bar extending through the connecting rod at a point near its butt end and detachable therefrom and having a pair of tapped passages therethrough, a pair of bolts adapted to be screwed into said passages and passing through the cap for securing the parts together, said end of the connecting rod having opposite grooves along the side thereof into which bolts extend to enable them to be located comparatively near together and yet be entirely outside of the body of the end of the connecting rod.

In testimony whereof I have hereunto affixed my signature.

RALPH L. MORGAN.